US009689458B2

(12) United States Patent
Pruksch et al.

(10) Patent No.: US 9,689,458 B2
(45) Date of Patent: Jun. 27, 2017

(54) VIBRATION DAMPER FOR A SENSOR UNIT AND SENSOR ARRANGEMENT FOR A MOTOR VEHICLE

(71) Applicant: Robert Bosch GmbH, Stuttgart (DE)

(72) Inventors: Achim Pruksch, Neudenau (DE); Berthold Kaeferstein, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 14/654,243

(22) PCT Filed: Dec. 17, 2013

(86) PCT No.: PCT/EP2013/076911
§ 371 (c)(1),
(2) Date: Jun. 19, 2015

(87) PCT Pub. No.: WO2014/095871
PCT Pub. Date: Jun. 26, 2014

(65) Prior Publication Data
US 2015/0346232 A1    Dec. 3, 2015

(30) Foreign Application Priority Data

Dec. 20, 2012   (DE) .................... 10 2012 223 886

(51) Int. Cl.
*G01P 1/00* (2006.01)
*G01P 1/02* (2006.01)
(Continued)

(52) U.S. Cl.
CPC ............. *F16F 15/04* (2013.01); *F16F 1/00* (2013.01); *G01D 11/10* (2013.01); *G01P 1/003* (2013.01);
(Continued)

(58) Field of Classification Search
CPC ... G01P 1/003; G01P 1/023; F16F 1/00; F16F 15/04
(Continued)

(56) References Cited

U.S. PATENT DOCUMENTS 5,118,981 A * 6/1992 Kobayashi ....... B60G 17/01941
310/324
5,233,873 A * 8/1993 Mozgowiec ............ G01P 1/023
73/493
(Continued)

FOREIGN PATENT DOCUMENTS

DE        39 33 251 A1   4/1991
DE  10 2006 002 350 A1   7/2007
(Continued)

OTHER PUBLICATIONS

International Search Report corresponding to PCT Application No. PCT/EP2013/076911, mailed Apr. 9, 2014 (German and English language document) (7 pages).

*Primary Examiner* — Helen Kwok
(74) *Attorney, Agent, or Firm* — Maginot, Moore & Beck LLP

(57) ABSTRACT

A vibration damper for a sensor unit comprises an elastic damping element including a central plate, a plurality of damping fingers joined at a first end to the central plate, and a plurality of fastening surfaces. At least two fastening surfaces of the plurality of fastening surfaces are disposed at a distance from each other in a first spatial direction. The damping element is flexurally elastically soft along the first spatial direction and is formed with a higher stiffness in a main extension plane defined perpendicular to the first spatial direction. A layer of adhesive is applied to each of the at least two fastening surfaces which are configured to be subjected to shear stress as a result of vibrations in the main extension plane.

9 Claims, 2 Drawing Sheets

(51) Int. Cl.
*F16F 15/04* (2006.01)
*F16F 1/00* (2006.01)
*G01D 11/10* (2006.01)
*G01P 15/08* (2006.01)

(52) U.S. Cl.
CPC ...... *G01P 1/023* (2013.01); *G01P 2015/0882* (2013.01)

(58) Field of Classification Search
USPC .......................................................... 73/493
IPC ............................................... G01P 1/003,1/023
See application file for complete search history.

(56) References Cited

U.S. PATENT DOCUMENTS

| | | | | |
|---|---|---|---|---|
| 5,546,644 A * | 8/1996 | Kakizaki | ................ | G01P 1/023 29/25.35 |
| 6,111,338 A * | 8/2000 | Otsuchi | ............... | G01P 15/0922 310/344 |
| 6,182,508 B1 * | 2/2001 | Takeuchi | ........... | G01C 19/5607 310/326 |
| 6,708,564 B2 * | 3/2004 | Ishikawa | ............ | G01C 19/5719 73/493 |
| 7,721,603 B2 * | 5/2010 | Ingrisch | ................. | G01C 21/16 73/494 |
| 2003/0177831 A1 * | 9/2003 | Ikezawa | .................. | G01P 1/006 73/514.16 |
| 2005/0257615 A1 * | 11/2005 | Ohta | .................. | G01C 19/5719 73/504.12 |
| 2006/0266117 A1 * | 11/2006 | Ino | ...................... | G01P 15/0802 73/514.16 |
| 2010/0192689 A1 * | 8/2010 | Ulm | ..................... | B81B 7/0012 73/430 |
| 2010/0225476 A1 * | 9/2010 | Klose | ................... | A01K 29/005 340/540 |
| 2014/0001687 A1 * | 1/2014 | Braman | ................. | F16F 15/08 267/141.2 |

FOREIGN PATENT DOCUMENTS

| | | |
|---|---|---|
| DE | 10 2007 062 700 A1 | 7/2009 |
| DE | 10 2009 044 005 A1 | 3/2011 |
| DE | 10 2010 001 023 A1 | 7/2011 |
| EP | 1 132 743 A2 | 3/2001 |

* cited by examiner

VIBRATION DAMPER FOR A SENSOR UNIT AND SENSOR ARRANGEMENT FOR A MOTOR VEHICLE

This application is a 35 U.S.C. §371 National Stage Application of PCT/EP2013/076911, filed on Dec. 17, 2013, which claims the benefit of priority to Serial No. DE 10 2012 223 886.7, filed on Dec. 20, 2012 in Germany, the disclosures of which are incorporated herein by reference in their entirety.

BACKGROUND

The disclosure is based on a fastening arrangement for a sensor arrangement, and on a corresponding sensor arrangement for a motor vehicle.

In modern motor vehicles, active and passive safety systems are used, such as for example restraining systems, such as for example airbags, safety belts etc., as well as systems for regulating the vehicle dynamics, such as for example ESP (Electronic Stability Program), ABS (Antilock Braking System) etc. A significant component of such systems are inertial sensors, which are used for the measurement of accelerations and/or of yaw rates or rates of turn of the motor vehicle and which are preferably implemented as micromechanical or microelectromechanical sensors. During operation such sensors are set into oscillating motions by a suitable mechanical stimulation, and forces and/or accelerations that occur are measured and analyzed.

An inertial sensor arrangement, in particular for mounting in a motor vehicle, is described in De 10 2006 002 350 A1. The inertial sensor arrangement described comprises a sensor module that is mounted on a support and that comprises a micromechanically manufactured inertial sensor and an analysis circuit. The sensor module is joined to the support by an elastic coupling element.

A sensor arrangement is described in DE 10 2007 062 700 A1 that comprises a base plate, a sensor module, a damping element and a mounting frame. The base plate comprises a main extension plane and an aperture perpendicular to the main extension plane, wherein the mounting frame is fixed in the aperture. A damping element is disposed between the mounting frame and the aperture, wherein the sensor module is pressed into the mounting frame in a form fit and force fit manner. The sensor module comprises at least one connecting pin having a connecting surface outside of the sensor module that is formed essentially parallel to the main extension plane. The connecting surface is electrically conductively contacted with a bonding wire.

SUMMARY

The vibration damper according to the disclosure for a sensor unit has by contrast the advantage that resonances in the main extension plane of the vibration damper are attenuated by direction-dependent stiffnesses.

When using the vibration damper according to the disclosure in a sensor unit for a motor vehicle, the motion of a mounting plate in the natural vibration modes can be advantageously reduced and the built-in micromechanical or microelectromechanical sensor, which is preferably implemented as an acceleration sensor, is no longer disrupted. This enables the sensor to measure the actual useful signal, which represents a low frequency vehicle movement of up to 5 Hz with acceleration values that are smaller than the acceleration due to gravity, without errors.

Embodiments of the disclosure provide a vibration damper for a sensor unit with an elastic damping element. According to the disclosure, the damping element comprises a central plate, a plurality of damping fingers, which are joined at one end to the central plate, and a plurality of fastening surfaces, wherein at least two fastening surfaces are disposed at a distance apart in a first spatial direction. The damping element is flexurally elastically soft along the first spatial direction and has greater stiffness in a main extension plane that is arranged perpendicular to the first spatial direction, wherein a layer of adhesive is applied to each of the at least two fastening surfaces, which are subjected to shear stress as a result of vibrations in the main extension plane.

Furthermore, a sensor arrangement for a motor vehicle with a housing and a base plate is proposed, which is joined by means of fastening elements to a supporting plate on which at least one micromechanical or microelectromechanical sensor is disposed, wherein the supporting plate is vibrationally decoupled from the housing by means of a vibration damper according to the disclosure.

It is advantageously ensured by embodiments of the vibration damper according to the disclosure that the damping element is relatively stiff in the main extension plane, because the natural frequency of the supporting plate is relatively high at approx. 1 kHz. The stiffness of the damping element perpendicular to the main extension plane or perpendicular to the supporting plate is relatively low in order to allow thermal expansion and to compensate manufacturing or mounting tolerances. Above all, vibration damping can be achieved in the plane as a result of the planar form of the fastening surfaces and the choice of connection points without a conflict with the heat expansion or thermal expansion occurring.

As a result of the flexurally elastically soft implementation along the first spatial direction and the thin layers of adhesive, no additional forces that act on the fastening element occur during thermal expansion in the plane and even during assembly of the damping element. Furthermore, the layers of adhesive are made very thin in order to enable use under shear stress and a good damping effect. Advantageously, embodiments of the vibration damper according to the disclosure have a simple mechanical construction and can be simply manufactured and assembled. This enables embodiments of the vibration damper according to the disclosure to be simply and rapidly adapted to different installation situations and vibration modes that are dependent on the different sensor unit or controller versions.

The damping element is shaped and assembled such that it is for example attached to thermal packages, electrical or electronic components and/or other suitable attachment points on the circuit board with a thin layer of adhesive at the "fingertips", so that the layers of adhesive are subjected to shear stress during planar vibrations of the supporting plate. The approach according to the disclosure offers a number of vibration and manufacturing optimized design options thanks to the diverse geometric and material parameters. By suitably shaping the damping element or "damping hand" and attaching it to the "correct" points on the housing and on the supporting plate, a heat expansion or thermal expansion in the plane does not result in such high mechanical stresses. Hence the fastening of the central plate of the damping element preferably takes place in the thermal centre of the supporting plate, so that the damping fingers expand in the same way as the supporting plate.

Advantageous improvements of the vibration damper for a sensor unit and the sensor arrangement for a motor vehicle are specified in this disclosure.

It is particularly advantageous that the central plate can comprise a first fastening surface and each damping finger can comprise a second fastening surface at its free end. A transition region can be disposed between the central plate and the free ends of the damping fingers in each case, being able to be implemented with two bending edges. This advantageously enables a simple mechanical structure and rapid adaptation to different installation situations. Because the damping element is not planar, but each damping finger is slightly folded twice, different distances between the cover and the supporting plate can be compensated and the forces perpendicular to the supporting plate occurring during assembly or during operation are reduced.

In an embodiment of the vibration damper according to the disclosure, the shape and dimensions of the damping element, in particular of the central plate and the damping fingers, can be specified depending on the natural vibration modes and a planar thermal expansion of an assembly that is to be damped in such a way that restriction of the thermal expansion is minimized, so that simple adaptation is possible to different embodiments of the supporting plate, which can have different natural frequencies and thermal centers. Thus for example optimal adjustment of the damping of the supporting plate can be advantageously achieved as a result of the shape and thickness of the central plate and the width of the damping fingers and support position.

A particularly simple and inexpensive implementation of the vibration damper according to the disclosure is enabled if the damping element is implemented as a stamped and bent part.

In an embodiment of the sensor arrangement according to the disclosure, the central plate of the damping element can be joined to the housing by means of a first layer of adhesive. The individual damping fingers of the damping element can each be joined to an attachment point of the supporting plate by means of a second layer of adhesive. The two layers of adhesive act as damping elements and can be applied during manufacture with a dispenser for example. Furthermore, it can be ensured that during mounting no high forces arise on the fastening elements or the mounting plate as a result of the gluing of the damping element.

In a further embodiment of the sensor arrangement according to the disclosure, the attachment points of the supporting plate can be disposed on thermal packages and/or electrical or electronic components and/or on other suitable points that are permanently joined to the supporting plate. The supporting plate is preferably joined to the base plate by means of pressfit pins. The individual pressfit pins are very stiff in the longitudinal direction and are disposed distributed over the entire supporting plate.

Exemplary embodiments of the disclosure are shown in the figures and are explained in detail in the following description. In the figures the same reference characters refer to components or elements that perform the same or analogous functions.

DETAILED DESCRIPTION

A frequently occurring problem when using inertial sensors in motor vehicles are interfering accelerations, which can occur depending on the mounting point of the sensor. Said interfering accelerations have a particularly strong influence on the output signals of the sensor if their frequency lies within the vicinity of a stimulation frequency of the sensor or a natural frequency of the sensor arrangement. Using vibration measurements and FEM analyses (FEM: Finite Elements Method), it can be can demonstrated that enhancement factors, which can occur because of naturel modes of the housing, can interfere massively with signals of the inertial sensors. A particularly interfering influence arises as a result of the first natural mode in the frequency range from 30 Hz to 4 kHz. A relatively high sensitivity of the inertial sensors, in particular of a two-axis acceleration element, can be demonstrated within said frequency range.

A supporting plate or board of a sensor unit in known ESP/ABS controllers with integrated acceleration sensors is for example joined to a base plate by means of pressfit pins. In the event of vibration stimulation during operation (engine, valves etc.), vibrations essentially occur in two directions of a main extension plane of the supporting plate or board. The supporting plate or board acts as an oscillating mass and the pressfit pins act as small flexural springs. Sensor interference can occur because the acceleration sensor disposed on the supporting plate or board measures in the main extension plane of the supporting plate or board. As a result of the pressfit pins, the structure is stiff perpendicular to the supporting plate or board because the individual pins are very stiff in the longitudinal direction and are distributed over the entire surface of the supporting plate or board.

Figure 1:
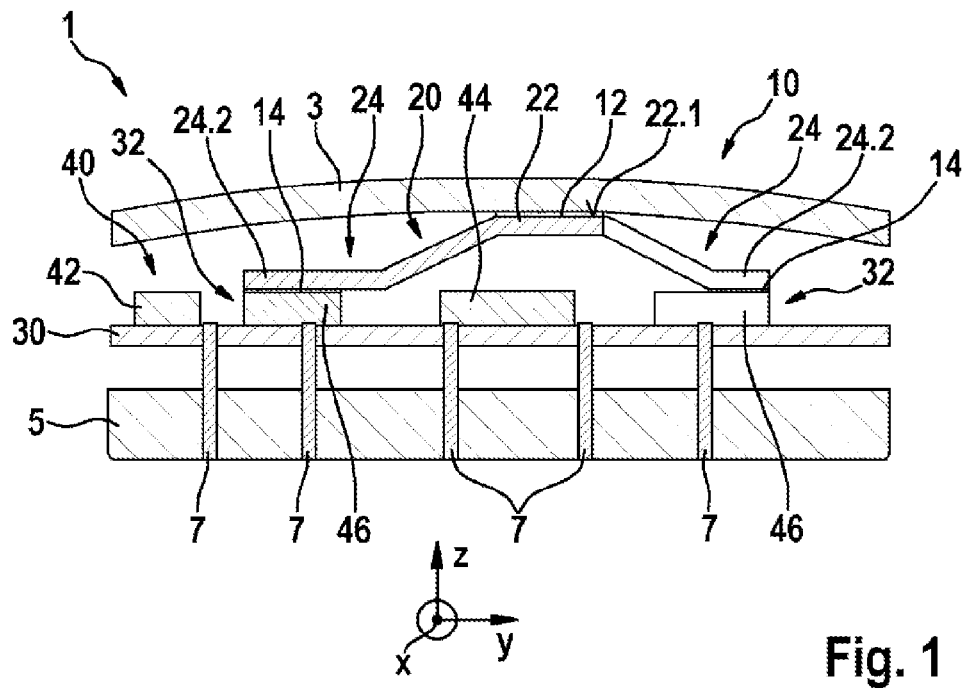
FIG. 1 shows a schematic sectional representation of an exemplary embodiment of a sensor unit according to the disclosure with a vibration damper according to the disclosure.
Figure 2:
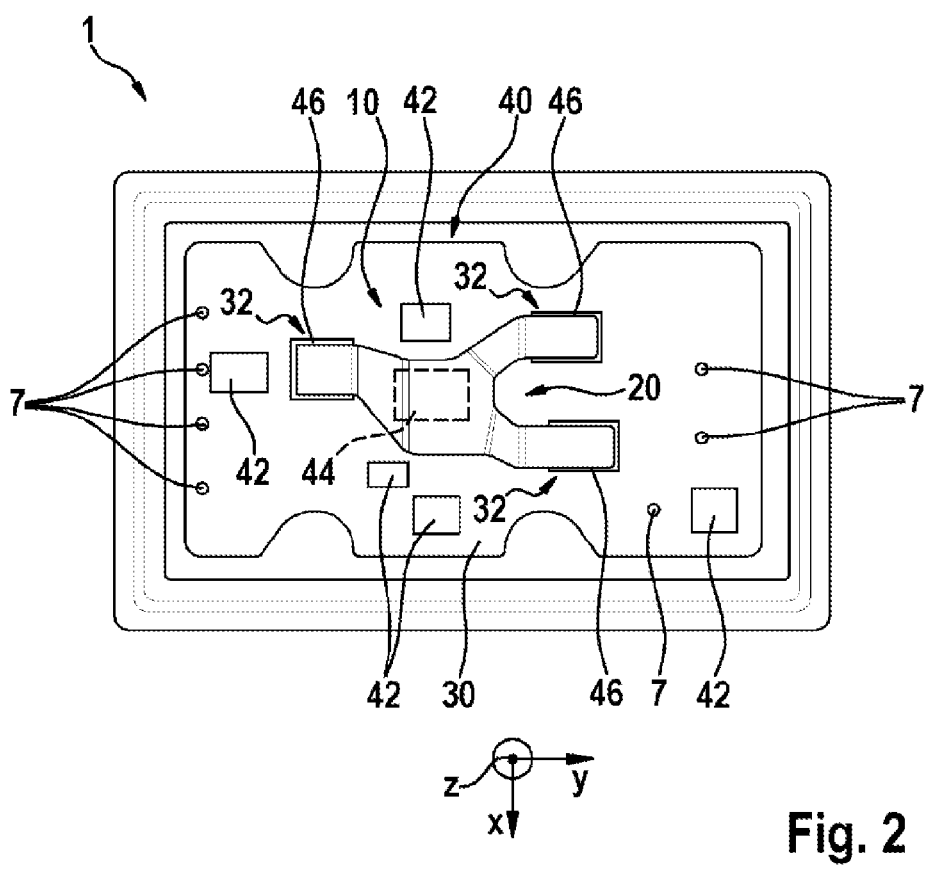
FIG. 2 shows a schematic top view of the exemplary embodiment of the sensor unit according to the disclosure shown in FIG. 1 without a cover.
Figure 3:
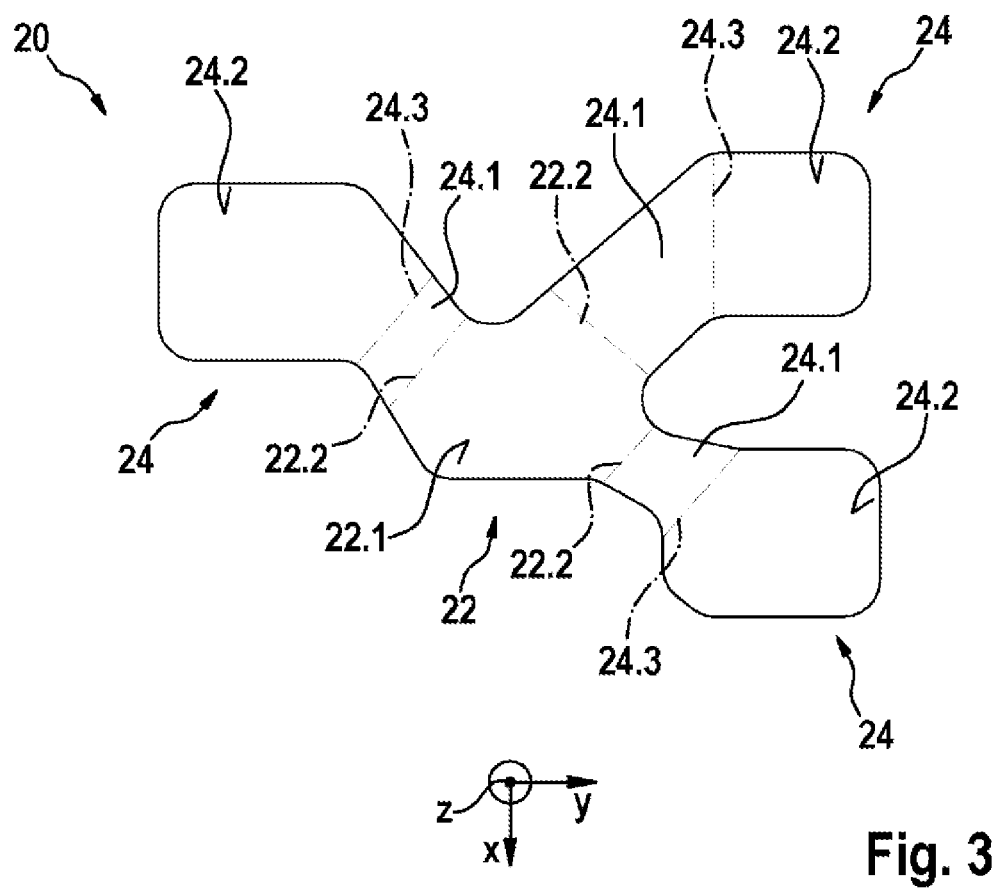
FIG. 3 shows a schematic top view of a vibration damper according to the disclosure for the sensor unit shown in FIGS. 1 and 2.

As is apparent from FIGS. 1 to 3, the exemplary embodiment shown of a sensor unit 1 according to the disclosure comprises a housing 3 and a base plate 5 that is joined by means of fastening elements 7 to a supporting plate 30 on which at least one micromechanical or microelectromechanical sensor 44 is disposed. The supporting plate 30 is decoupled from the housing 3 by means of a vibration damper 10 according to the disclosure. The sensor 44 is for example implemented as a so-called inertial sensor and can be used for the measurement of accelerations and/or of yaw rates or rates of turn of the motor vehicle in relation to different spatial axes. In addition, a suitable electronic analysis and control circuit 40 can be integrated within the sensor unit 1 and disposed on the supporting plate 30.

The vibration damper 10 according to the disclosure comprises an elastic damping element 20. According to the disclosure, the damping element 20 comprises a central plate 22, a plurality of damping fingers 24, which are joined at one end to the central plate 22, and a plurality of fastening surfaces 22.1, 24.2. At least two fastening surfaces 22.1, 24.2 are disposed at a distance from each other in a first spatial direction z. The damping element 20 is of a flexurally elastically soft form along the first spatial direction z and has greater stiffness in a main extension plane x-y that is arranged perpendicular to the first spatial direction z, wherein a layer of adhesive 12, 14 is applied to each of the at least two fastening surfaces 22.1, 24.2, said layers of adhesive being subjected to shear stress during oscillations in the main extension plane.

As can further be seen from FIGS. 1 to 3, a transition region 24.1, which is implemented with two bending edges 24.3, is disposed between the central plate 22 and the free ends of the damping fingers 24 ("fingertips") in each case. The shape and dimensions of the damping element 20 are specified depending on the natural vibration modes and a planar thermal expansion of an assembly that is to be damped with restriction of the thermal expansion that is to be minimized, in this case of the supporting plate 30. In the exemplary embodiment shown, the damping element 20 is implemented as a stamped and bent plate component. The damping element 20 that is implemented as a plate component is very thin and has a thickness significantly less than 0.1 mm. This results in the damping element 20 being very stiff in its main extension plane x-y and flexurally elastically soft perpendicular to the main extension plane x-y as a result of the selected hand or spider-shaped molding with the central plate 22 and the damping fingers 24.

The central plate 22 comprises a first fastening surface 22.1 and each damping finger 24 comprises a second fastening surface 24.2 at its free end.

As can further be seen from FIGS. 1 and 2, the supporting plate 30 is joined to the base plate 5 by means of a plurality of fastening elements 7 implemented as pressfit pins. In addition, the central plate 22 of the damping element 20 is joined to the housing 3, in this case with a housing cover, by means of a first layer of adhesive 12. The individual damping fingers 24 of the damping element 20 are each joined to an attachment point 32 of the supporting plate 30 at the "fingertip" by means of a second layer of adhesive 14. In the exemplary embodiment shown, the attachment points 32 of the supporting plate 30 are disposed on thermal packages 46. In addition or alternatively, the attachment points 32 can be disposed on electrical or electronic components 42 of the analysis and control circuit 40 or at other suitable points that are permanently joined to the supporting plate 30.

Embodiments of the damping element 20 for the vibration damper 10 according to the disclosure are shaped and mounted such that the respective vibration damper 10 according to the disclosure is attached to the supporting plate 30 at suitable attachment points 32 by means of thin second layers of adhesive 14 on the "fingertips" of the damping fingers 24, so that during planar vibrations of the supporting plate 30 the second layers of adhesive 14 are subjected to shear stress. Said motions of the supporting plate 30 are transferred to the central plate 22 of the damping element 20 by means of the damping fingers 24, the central plate being glued by means of a first layer of adhesive 12 to the housing 3 of the sensor unit 1 or of a controller. The housing 3 acts as a mechanical thrust bearing element for supporting the damping fingers 24 because of its stiffness and mass. The two layers of adhesive 12, 14 act as damping elements for vibrations in the main extension plane x-y of the supporting plate 30 and can be applied during manufacture by means of a dispenser.

The vibration damper 10 according to the disclosure is not planar, but slightly bent twice per damping finger 24 and can thus be configured for different distances between the supporting plate 30 and the housing 3. As a result, embodiments of the vibration damper 10 according to the disclosure reduce the forces acting perpendicular to the supporting plate 30 that occur during assembly and in operation. As a result of the shape and thickness of the damping element 20 and the width of the damping fingers 24 and the thrust bearing position, tuning of the vibration damper 10 according to the disclosure can be carried out that is optimally adapted to the natural vibration modes and the thermal centre of the supporting plate 30. By suitably shaping the damping element 20 or "damping hand" and attaching the same to the "correct" points on the housing 3 and on the supporting plate 30, heat expansion or thermal expansion in the plane does not result in such strong mechanical stresses. Hence the attachment of the central plate 22 of the damping element 20 preferably takes place in the thermal centre of the supporting plate 30, so that the damping fingers 24 expand in the same way as the supporting plate 30. If for example a reciprocal translational motion occurs during operation and if for example the thermal centre of the planar thermal expansion is disposed in the centre of the damping element 20, then the thermal stresses are rather small and symmetrical. Hence the position of the optimum of the maximum vibration damping and minimum mechanical stress enhancement caused by heat expansion or thermal expansion is preferably calculated by simulation prior to assembly. The shape of the central plate 22 and the damping fingers 24 of the damping element 20 and the connection points on the housing cover 3 and on the supporting plate 30 are selected accordingly.

Furthermore, as a result of the gluing of the vibration damper 10 according to the disclosure, high forces on the fastening element 7 implemented as pressfit pins or the supporting plate 30 are advantageously avoided during assembly. In the event of vibrations or impacts on the housing 3 of the sensor unit 1 or a corresponding controller, which are mainly caused in the perpendicular direction as a result of loose cable harnesses in the vehicle when travelling on a rough road, there is no transfer to the supporting plate because of the very soft spring action of the vibration damper 10 according to the disclosure perpendicular to the supporting plate 30, and hence there is also no interference with the sensor 44.

Embodiments of the disclosure enable damping of the resonances in the plane when using a transfer structure in the form of a vibration damper. The vibration damper according to the disclosure provides direction-dependent stiffnesses here in order to reduce the motion of the supporting plate in the natural vibration modes. As a result the built-in sensor, which is preferably implemented as an acceleration sensor, is no longer interfered with, so that the actual useful signal can be measured with greater signal quality.

The invention claimed is:

1. A vibration damper for a sensor unit, comprising:
an elastic damping element including:
   a central plate;
   a plurality of damping fingers, each damping finger of the plurality of damping fingers joined at a first end to the central plate; and
   a plurality of fastening surfaces, wherein:
the central plate has a first fastening surface of the plurality of fastening surfaces,
at least one of the damping fingers of the plurality of damping fingers has a second fastening surface of the plurality of fastening surfaces,
the first and second fastening surfaces are disposed at a distance from each other in a first spatial direction,
the damping element is flexurally elastically soft along the first spatial direction and is formed with a higher stiffness in a main extension plane defined perpendicular to the first spatial direction,
a first layer of adhesive is applied to the first fastening surface and a second layer of adhesive is applied to the second fastening surface, and the first and second layers of adhesive are configured and arranged to be subjected to shear stress as a result of vibrations in the main extension plane, and the first fastening surface is fastened directly to a housing of the sensor unit via the first layer of adhesive and the second fastening surface is fastened directly to a supporting plate of the sensor unit via the second layer of adhesive.

2. The vibration damper as claimed in claim 1, wherein each damping finger of the plurality of damping fingers includes a second fastening surface at a free, second end.

3. The vibration damper as claimed in claim 2, further comprising:
a plurality of transition regions each having two bending edges, each of the plurality of transition regions located between the central plate and a respective free, second end of the plurality of damping fingers.

4. The vibration damper as claimed in claim 1, wherein a shape and a dimension of the damping element are configured depending on natural vibration modes and a planar thermal expansion of an assembly that is to be damped with restriction of a thermal expansion that is to be minimized.

5. The vibration damper as claimed in claim 1, wherein the damping element is a stamped and bent part.

6. A sensor arrangement, comprising:
a housing;
a base plate;
fastening elements;
a supporting plate, the base plate joined to the supporting plate by the fastening elements;
at least one micromechanical or microelectromechanical sensor positioned on the supporting plate; and
a vibration damper including an elastic damping element including a central plate, a plurality of damping fingers, each joined at a first end to the central plate, and a plurality of fastening surfaces, wherein:

the central plate has a first fastening surface of the plurality of fastening surfaces and at least one of the damping fingers of the plurality of damping fingers has a second fastening surface of the plurality of fastening surfaces, the first and second fastening surfaces are disposed at a distance from each other in a first spatial direction;

the damping element is flexurally elastically soft along the first spatial direction and is formed with a higher stiffness in a main extension plane defined perpendicular to the first spatial direction;

a first layer of adhesive is applied to the first fastening surface and a second layer of adhesive is applied to the second fastening surface, and the first and second layers of adhesive are configured and arranged to be subjected to shear stress as a result of vibrations in the main extension plane;

wherein the first fastening surface is directly fastened to the housing via the first layer of adhesive and the second fastening surface is directly fastened to the supporting plate via the second layer of adhesive, and wherein the supporting plate is joined to the housing via the vibration damper.

7. The sensor arrangement as claimed in claim 6, wherein the at least one damping finger is joined to an attachment point of the supporting plate via the second layer of adhesive.

8. The sensor arrangement as claimed in claim 7, wherein the attachment point of the supporting plate is located on a thermal package and/or on an electrical or electronic component which is/are permanently joined to the supporting plate.

9. The sensor arrangement as claimed in claim 6, further comprising:
pressfit pins, the supporting plate joined to the base plate by the pressfit pins.

* * * * *